United States Patent
Bentley et al.

(10) Patent No.: US 6,245,303 B1
(45) Date of Patent: Jun. 12, 2001

(54) REACTOR FOR PRODUCING HYDROGEN FROM HYDROCARBON FUELS

(75) Inventors: Jeffrey M. Bentley, Westford; William L. Mitchell, Belmont; Lawrence G. Clawson, Dover; James C. Cross, III, Ipswich, all of MA (US)

(73) Assignee: Arthur D. Little, Inc., Cambridge, MA (US)

( * ) Notice: Subject to any disclaimer, the term of this patent is extended or adjusted under 35 U.S.C. 154(b) by 0 days.

(21) Appl. No.: 09/006,727

(22) Filed: Jan. 14, 1998

(51) Int. Cl.$^7$ ................................... B01J 8/02; B01J 8/04
(52) U.S. Cl. .......................... 422/193; 422/190; 422/192; 422/198; 422/211; 422/218
(58) Field of Search .................................... 422/191, 192, 422/193, 238, 239, 203, 206, 198, 218, 211, 204, 190, 181; 48/215, 214 A, 94, 95, 127.9, 127.1, 127.7, 127.5, 198.1, 198.6, 198.7; 423/650, 651, 653, 654

(56) References Cited

U.S. PATENT DOCUMENTS

| 1,797,426 | | 3/1931 | Larson . | |
|---|---|---|---|---|
| 2,279,153 | * | 4/1942 | Wilcox | 518/707 |
| 2,315,208 | * | 3/1943 | Kinnaird | 422/218 |
| 2,517,525 | * | 8/1950 | Cummings | 422/192 |

(List continued on next page.)

FOREIGN PATENT DOCUMENTS

| 37 08 957 A1 | 10/1988 | (DE) . |
|---|---|---|
| 39 39 544 A1 | 6/1991 | (DE) . |
| 0 082 609 | 6/1983 | (EP) . |
| 0 112 613 A2 | 7/1984 | (EP) . |
| 0 312 757 A1 | 4/1989 | (EP) . |
| 0 360 505 A2 | 3/1990 | (EP) . |
| 0 361 648 A1 | 4/1990 | (EP) . |
| 0 442 164 A1 | 8/1991 | (EP) . |
| 0 600 621 A1 | 6/1994 | (EP) . |
| 0 621 1501 | 8/1994 | (EP) . |
| 1060166 | 1/1967 | (GB) . |
| 1 408 560 | 10/1975 | (GB) . |
| 2 084 894 | 10/1980 | (GB) . |
| 2 179 366 | 3/1987 | (GB) . |
| 2 268 322 | 1/1994 | (GB) . |
| 2 296 719 | 7/1996 | (GB) . |

OTHER PUBLICATIONS

International Search Report from PCT/US97/14906 mailes Mar. 13, 1998.
"Development of a Partial Oxidation Reformer for Liquid Fuels," Apr. 2, 1996.
"Development of a Catalytic Partial Oxidation Ethanol Reformer for Fuel Cell Applications," Dec. 7, 1995.
"Development of an Ethanol Reformer for a Fuel Cell Bus" May 10, 1995.
"On–Board Ethanol Fuel Processor: Integrated System Design," Feb. 15, 1995.

(List continued on next page.)

*Primary Examiner*—Hien Tran
(74) *Attorney, Agent, or Firm*—Wallenstein & Wagner, Ltd.

(57) ABSTRACT

A reformer reactor 10 for producing a hydrogen-rich gas includes a first zone 18, a second zone 20, a third zone 22, a fourth zone 24 and a product gas collection space 40. The zones are sequentially adjacent. A flow path P1 is provided for directing flow of a reaction stream in diverging directions from the first zone 18 into the second zone 20, the flow of the reaction stream continuing in the same general diverging directions through the second zone 20 and into and through the third and fourth zones 22,24. Directing the flow in diverging directions permits flow into and through a zone over more than just a single cross-sectional geometry of the zone or a single cross-section of the flow path transverse to the direction of flows. This configuration can be used to require a lower pressure for flowing the reaction stream so as to reduce the parasitic requirements of the reactor. This configuration can also be used to increase throughput of the reactor.

55 Claims, 4 Drawing Sheets

U.S. PATENT DOCUMENTS

| | | | | |
|---|---|---|---|---|
| 2,989,380 | * | 6/1961 | Weiss et al. | 422/129 |
| 3,334,971 | | 8/1967 | James et al. . | |
| 3,421,826 | * | 1/1969 | Tope et al. | 431/328 |
| 3,438,759 | | 4/1969 | Linden et al. . | |
| 3,499,797 | | 3/1970 | Hooper . | |
| 3,531,263 | | 9/1970 | Sederquist . | |
| 3,541,729 | | 11/1970 | Dantowitz . | |
| 3,615,217 | | 10/1971 | O'Brien et al. . | |
| 3,645,701 | | 2/1972 | Banchik et al. . | |
| 3,733,181 | | 5/1973 | Tourtellotte et al. . | |
| 3,796,547 | | 3/1974 | Muenger . | |
| 3,909,299 | | 9/1975 | Corrigan . | |
| 3,920,416 | | 11/1975 | Houseman . | |
| 3,955,941 | | 5/1976 | Houseman et al. . | |
| 3,971,847 | | 7/1976 | Houseman . | |
| 3,982,910 | | 9/1976 | Houseman et al. . | |
| 4,059,076 | | 11/1977 | Kosaka et al. . | |
| 4,125,090 | | 11/1978 | Masunaga et al. . | |
| 4,169,879 | * | 10/1979 | Descoins et al. | 422/220 |
| 4,233,180 | | 11/1980 | Hausberger et al. . | |
| 4,236,899 | * | 12/1980 | Gulden et al. | 48/89 |
| 4,236,941 | | 12/1980 | Main, Jr. . | |
| 4,246,235 | | 1/1981 | Rogers . | |
| 4,257,920 | | 3/1981 | Sugier et al. . | |
| 4,338,292 | | 7/1982 | Duranieau . | |
| 4,365,006 | | 12/1982 | Baker . | |
| 4,372,920 | | 2/1983 | Zardi . | |
| 4,405,562 | | 9/1983 | Zardi et al. . | |
| 4,452,854 | | 6/1984 | Merriam et al. . | |
| 4,478,793 | | 10/1984 | Vickers . | |
| 4,504,447 | | 3/1985 | Spurrier et al. . | |
| 4,522,894 | | 6/1985 | Hwang et al. . | |
| 4,714,592 | * | 12/1987 | Zanma et al. | 422/192 |
| 4,716,023 | | 12/1987 | Christner et al. . | |
| 4,737,161 | | 4/1988 | Szydlowski et al. . | |
| 4,781,241 | | 11/1988 | Misage et al. . | |
| 4,789,384 | | 12/1988 | Martens et al. . | |
| 4,789,540 | | 12/1988 | Jenkins . | |
| 4,822,521 | | 4/1989 | Fuderer . | |
| 4,830,091 | | 5/1989 | Dierke et al. . | |
| 4,836,831 | | 6/1989 | Martens . | |
| 4,838,020 | | 6/1989 | Fujitsuka . | |
| 4,849,187 | | 7/1989 | Uozu et al. . | |
| 4,861,347 | | 8/1989 | Szydlowski et al. . | |
| 4,879,189 | | 11/1989 | Snopkowski . | |
| 4,888,031 | | 12/1989 | Martens . | |
| 4,897,253 | | 1/1990 | Jenkins . | |
| 4,904,455 | | 2/1990 | Karafian et al. . | |
| 4,909,808 | | 3/1990 | Voecks . | |
| 4,923,768 | | 5/1990 | Kaneko et al. . | |
| 4,943,493 | | 7/1990 | Vartanian . | |
| 4,988,580 | | 1/1991 | Ohsaki et al. . | |
| 5,006,131 | | 4/1991 | Karafian et al. . | |
| 5,019,463 | | 5/1991 | Matsubara et al. . | |
| 5,026,536 | | 6/1991 | Shioiri et al. . | |
| 5,030,440 | | 7/1991 | Lywood et al. . | |
| 5,030,661 | | 7/1991 | Lywood . | |
| 5,047,299 | | 9/1991 | Shockling . | |
| 5,098,690 | | 3/1992 | Koves . | |
| 5,141,823 | | 8/1992 | Wright et al. . | |
| 5,193,635 | | 3/1993 | Mizuno et al. . | |
| 5,207,185 | | 5/1993 | Greiner et al. . | |
| 5,209,908 | | 5/1993 | Koves et al. . | |
| 5,221,586 | | 6/1993 | Morimoto et al. . | |
| 5,246,791 | | 9/1993 | Fisher et al. . | |
| 5,248,566 | | 9/1993 | Kumar et al. . | |
| 5,248,567 | | 9/1993 | Amemiya et al. . | |
| 5,250,270 | | 10/1993 | Noe . | |
| 5,260,640 | | 11/1993 | Carabetta et al. . | |
| 5,299,536 | | 4/1994 | Moard et al. . | |
| 5,300,275 | | 4/1994 | Lywood . | |
| 5,340,663 | | 8/1994 | Buswell et al. . | |
| 5,344,721 | | 9/1994 | Sonai et al. . | |
| 5,346,779 | | 9/1994 | Nakazawa . | |
| 5,360,679 | | 11/1994 | Buswell et al. . | |
| 5,366,704 | | 11/1994 | Koves et al. . | |
| 5,437,123 | | 8/1995 | Greiner et al. . | |
| 5,441,546 | | 8/1995 | Moard et al. . | |
| 5,458,857 | | 10/1995 | Collins et al. . | |
| 5,462,719 | | 10/1995 | Pedersen et al. . | |
| 5,470,360 | | 11/1995 | Sederquist . | |
| 5,484,576 | | 1/1996 | Langer et al. . | |
| 5,486,313 | | 1/1996 | DeJong et al. . | |
| 5,486,428 | | 1/1996 | Gardner et al. . | |
| 5,520,891 | | 5/1996 | Lee . | |
| 5,527,632 | | 6/1996 | Gardner . | |
| 5,529,484 | | 6/1996 | Moard et al. . | |
| 5,546,701 | | 8/1996 | Greiner et al. . | |
| 5,637,415 | | 6/1997 | Meltser et al. . | |
| 5,643,692 | | 7/1997 | Ohmi . | |
| 5,645,950 | | 7/1997 | Benz et al. . | |
| 5,648,182 | | 7/1997 | Hara et al. . | |
| 5,649,983 | | 7/1997 | Akagi . | |
| 5,651,800 | | 7/1997 | Mizuno et al. . | |
| 5,676,911 | | 10/1997 | Baumert et al. . | |
| 5,702,838 | | 12/1997 | Yasumoto et al. . | |
| 5,759,949 | | 6/1998 | Grigorova et al. . | |
| 5,762,658 | * | 6/1998 | Edwards et al. | 48/127.7 |
| 5,827,485 | * | 10/1998 | Libal et al. | 422/179 |
| 5,858,314 | * | 1/1999 | Hsu et al. | 422/211 |
| 5,885,442 | * | 3/1999 | Lapunow et al. | 208/134 |

OTHER PUBLICATIONS

"Catalyst Handbook," $2^{nd}$ ed., Sections 4.1.1 to 4.11.9, Ed. M.V. Twigg, Wolfe Publishing, 1989.

Catalytica Associates, Inc., "Overview of Fuel–Processing Technologies For Fuel–Cell Power Generation," Catalytica File No. 1036, Nov. 6, 1978.

John Houseman and D.J. Cerini, "On–Board Hydrogen Generator for a Partial Hydrogen Injection Internal Combustion Engine" *Society of Automotive Engineers*, Aug. 12–16, 1974.

Search Report from the European Patent Office mailed Jun. 30, 1998.

* cited by examiner

REACTOR FOR PRODUCING HYDROGEN FROM HYDROCARBON FUELS

DESCRIPTION

1. Technical Field

The present invention is related to reactors which liberate hydrogen from hydrocarbons by reforming reactions, and more particularly to novel: reactor geometries; reaction zone relationships; reaction stream flow paths; heat transfers; and, reactant feed systems.

2. Background of the Invention

Reforming hydrocarbons including alcohols to produce hydrogen is well known and many reactors have been constructed for this purpose, for example see U.S. Pat. No. 5,458,857 to Collins et. al., and U.S. Pat. No. 5,030,440 to Lywood et. al. Reforming reactions are also known to be coupled in a reactor process stream with partial oxidation reactions (e.g., autothermal reforming, and shift reactions.

One important use of the hydrogen liberated by reforming is the production of electricity in an electrochemical fuel cell which uses the hydrogen as a fuel. A significant advantage of producing hydrogen in this manner is that reactors can be coupled directly to a fuel cell and can be controlled to produce hydrogen as needed based upon a fuel cell's load demands. The storage and handling of reactants to produce the hydrogen is easier, safer and more energy-dense than stored bulk, hydrogen.

Recently, a commercial market has emerged for clean, portable, electric power generation from fuel cells. To enhance portability of a fuel cell it is advantageous that it be compact and lightweight. Accordingly, a reactor to supply hydrogen to the fuel cell must also be compact and lightweight. The reactants on which a hydrogen-producing reactor operates should be readily available, to foster acceptance and wide usage. A preferable reactant fuel should be easily storable to minimize fuel storage volume.

However, problems exist with conventional reactor designs with regard to meeting the above-stated needs of portability and compactness. A small system employing conventional technology is anticipated to have increased heat losses relative to reactant fuel throughput. This would result in inherently lower efficiencies than conventional systems used for larger power outputs.

Also, parasitic power requirements, which are generally dominated by air or hydrocarbon fuel compressors, blowers or pumps, can reduce the usable total energy-producing potential of the system sufficiently to make such a system unattractive for utilization in most portable applications.

One cause for the need of parasitic power is the total pressure drop of a reaction stream through a reactor having two or more zones where reactions occur. The pressure drop (or looked at another way the pressure required to drive a reaction stream through the reactor) results in-part, from the internal geometries and reaction stream flow paths provided by these conventional reactors.

Some have provided reactors which direct the reaction stream along tortuous flow paths, such as through helical zones, or by changing (most often, completely reversing) flow directions in one zone versus another. Also, the reaction stream may be transferred from one zone to another through some form of constricting geometry such as an orifice or annular transition zone, for example, see Collins et. al. and Lywood et. al. These types of flow paths, which among other things, are designed to effect advantageous heat transfers, increase pressure requirements for the system.

Others have provided reactors where the reaction stream flow path from zone to zone is more direct and is generally in a single direction traversing zone to zone. However, these configurations limit flow throughput by providing a flow path area only as large as a single cross-sectional area of the reactor zone, for example see U.S. Pat. Nos. 4,822,521 to Fuderer; U.S. Pat. No. 4,789,540 to Jenkins; U.S. Pat. No. 4,716,023 to Christner; U.S. Pat. No. 4,522,894 to Hwang et. al.

The present invention has been provided to cure the above deficiencies in the art and to provide other advantages to meet the needs of the market for the production of hydrogen for general purposes and in particular as a source of fuel for fuel cells.

SUMMARY OF THE INVENTION

The present invention provides a reformer reactor which liberates hydrogen from hydrocarbon fuels including alcohol, with carbon dioxide, water, and carbon monoxide as by-products. The hydrogen produced by the reactor, among other things, can be electrochemically combined with oxygen in a fuel cell to produce electric power.

Preferred embodiments of the invention were developed primarily for portable power applications requiring a relatively small chemical processing system. Nevertheless, the same principals applicable to the preferred embodiments of the present invention are believed to provide advantages for larger systems for producing hydrogen for its many purposes in industry.

For example, the following principles of structure and function contemplated by the present invention are believed to apply generally to reactors for reforming hydrocarbon fuels to make hydrogen: internal and overall reactor geometry permitting reduced pressure requirements for reaction stream flow; synergistic relationship between reaction stream flow path and overall thermal losses of the reactor; reduction of parasitic power requirements; synergistic heat transfers between reaction stream flow paths and reactant feed stream preheat requirements; optimization of heat transfer while minimizing flow restrictions on the reaction stream; and, the provision of thermal gradients across catalyst beds for optimization of catalyzed reactions. According to the invention one or more of these principles may be applied to, or result from, the following novel structures.

A reformer reactor according to the invention includes at least a first zone and a second zone adjacent the first zone. A flow path is provided for directing flow of a reaction stream in diverging directions from the first zone into the second zone. The flow path of the reaction stream is such that the reaction stream continues in the same general diverging directions through the second zone as it did entering the second zone.

With a flow path according to the present invention, configured to permit flow in diverging directions and continuing in the same directions through each desired zone, a lower pressure is required for flowing the reaction stream. This reduces the parasitic requirements of the reactor. Conversely, if desired, the same configuration will permit a higher throughput for any given system power ascribed to flowing reactants.

In another respect, directing the flow in diverging directions also permits flow into and through a zone over more than just a single cross-sectional geometry of the zone or a single cross-section of the flow path transverse to the direction of flows. For example, in reactors where flow is axial, in one direction, flow from one zone to the next is limited to a flow path of no larger cross-sectional area than the cross section (taken transverse to the direction or flow) of the zone itself. If, however, according to the principles of the present invention, the flow path is directed from a first zone towards two second zones, one on either side of the first zone, the flow could be directed at 180 degree divergent directions down the same axis. This would effectively double the cross section of the flow path into and through the second zones. Accordingly, the pressure drop would decrease for the same level of throughput, or the throughput could doubled for the same pressure.

Flowing the reaction stream over larger areas (larger cross section) permits a lower flow rate for any given throughput. This advantageously can be used to achieve a longer residence time for the reactants in any given zone (at any given throughput) so as to increase the extent of reaction in the zone and thus, increase yields.

The principles of the invention are particularly advantageous with zones having cylindrical, hemispherical, or spherical geometries. In such cases the flow path can be directed in diverging radial directions away from the first zone and into and through subsequent zones. However, the same principles are believed to apply to other geometries including those having rectilinear and polygonal zone geometries.

To assist flow in diverging directions over large cross-sectional areas of a zone, the boundaries of the zones are made permeable to the flow of a reaction stream. A preferred way to accomplish this is to provide permeable partitions separating the various zones. Such partitions can have a plurality of spaced openings to permit the flow of the reaction stream therethrough in diverging directions. For example, one preferred partition is a screen mesh. The openings can also be sized and spaced so as to "partition" and regulate flow from one zone to the next. Partitioning in this manner can assist in avoiding having larger amounts of flow through certain areas of the zone than others. This increases yield and may reduce hot spots in the zones (such as those containing a catalyst), where exothermic reactions occur. The partitions can also serve to captivate granular catalysts in desired zones.

In a preferred reactor according to the invention, a partial oxidation reaction vessel is located within a first zone. The vessel has an opening for emission of partially oxidized hydrocarbons into the first zone; and, the number, size, and spacing of the partition openings are selected to control the flow rate and uniformity of the reaction stream from the first zone and into the second zone. The partition may also be constructed of material composition, thickness, and finish selected to provide a desired degree of thermal insulation or reflectivity, to assist in controlling heat transfer from the partial oxidation vessel into the second zone.

While it is contemplated that a reactor according to the invention may have any number of zones containing catalysts for catalyzing a desired reaction within a zone, a preferred embodiment specifies that a second zone contains a catalyst suitable for catalyzing a steam reforming reaction in the reaction stream, a third zone contains catalyst suitable for catalyzing a high-temperature shift reaction in the reaction stream, and a fourth zone includes a catalyst suitable for catalyzing a low-temperature shift reaction in the reaction stream.

According to another aspect of the invention a reactor is provided with means for heat exchange between heat generating portions of the reaction stream and a reactant feed stream prior to entry of the reactants into a first zone. The means is preferably disposed in at least one of a second, third, or subsequent zones so as to utilize heat from the reaction stream flowing therethrough to preheat the feed stream. Preferably the means is disposed in direct contact with a granular catalyst in at least one of the zones so as to utilize heat from the reactant stream and the heat from the catalyst to preheat the feed stream.

According to another aspect of the invention, the means for heat exchange with a reactant feed stream also includes a means for regulating the heat exchange in such a way as to achieve a desired in the catalyst and reaction stream temperature across the zone.

According to another aspect of the invention, a reactor includes a means for flowing oxygen to a first zone and a means for flowing a hydrocarbon fuel to be oxidized to the first zone. A means is provided for cooperating the means for flowing oxygen and the means for flowing fuel such that the flow of fuel assists the flow of oxygen to reduce parasitic power requirements in providing oxygen to the first zone. Preferably, the means for cooperating includes joining the fuel flow into the oxygen flow downstream of a source of the oxygen (preferably air) and flowing the fuel at a higher velocity than a velocity of the oxygen upstream of joining the fuel flow.

According to certain principles of the invention, advantageous reactor constructions can be provided by a vessel having a first zone for containing a reaction stream, a collection space for collecting product gas, and one or more intermediate zones are interposed between the first zone and the collection space. A means is provided for directing the reactant stream from the first zone to the collection space, primarily in directions coinciding with the directions of a substantial portion of the overall heat flux out of the vessel. Such a design is again most advantageous where all of the zones are arranged as nested; coaxial cylinders; hemispheres; or, spheres, and the vessel includes sufficient thermal insulation at appropriate areas such that heat flux and accordingly the reactant flow, is primarily radially outward from the first zone to the collection space.

According to the invention it is most advantageous with nested zones to provide a boundary between each zone, which is permeable to the reaction stream so as to permit flow between relevant zones to and through each subsequent zone through the respective boundaries therebetween.

Other advantages and aspects of the present invention will become apparent upon reading the following description of the drawings and detailed description of the invention.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. It should also be understood that not every disclosed or contemplated embodiment of the invention needs to utilize all of the various principles disclosed herein to achieve benefits according to the invention.

Figure 1:
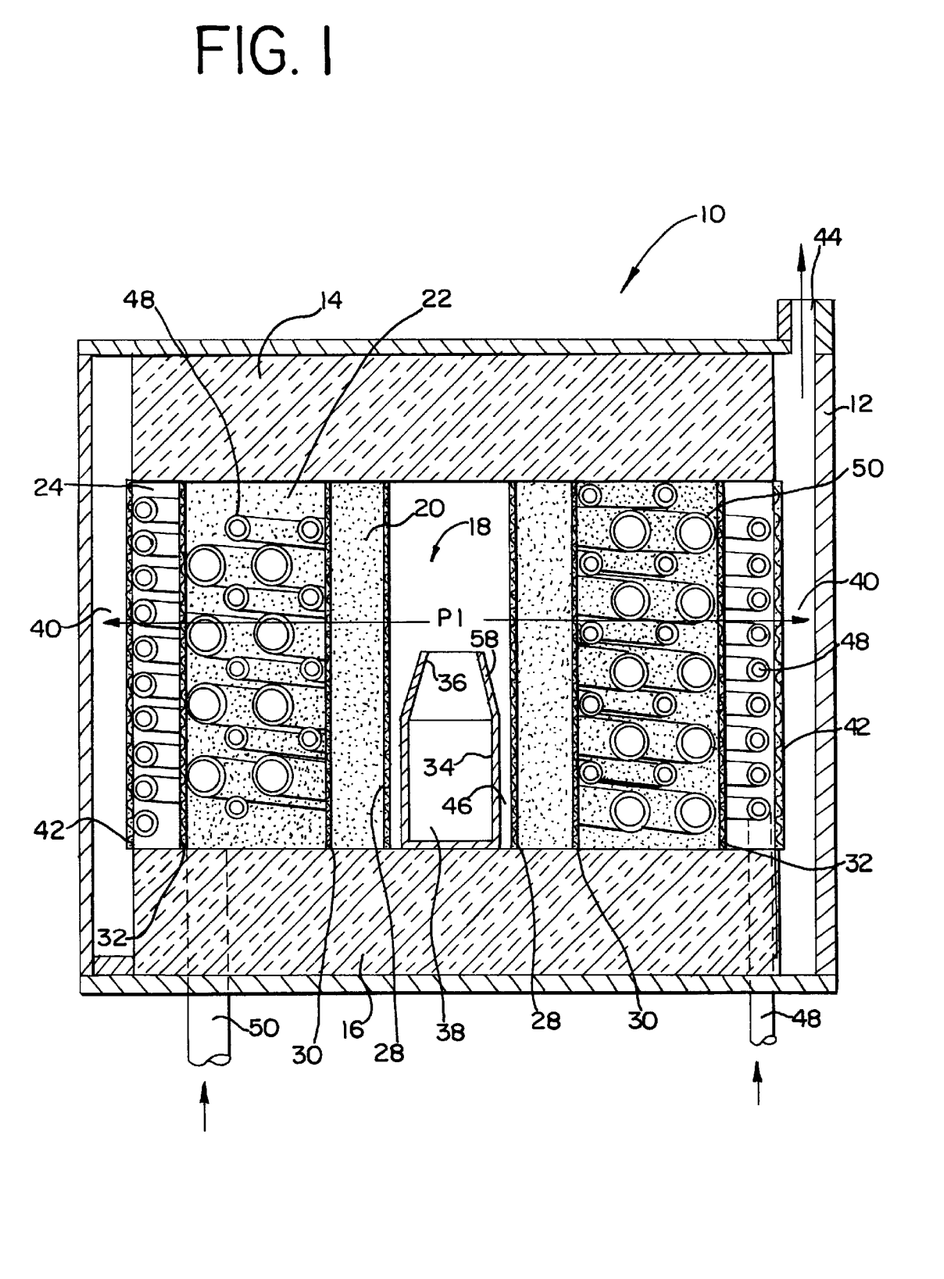
FIG. 1 is a view of a cylindrical reformer reactor 10 in vertical cross section.

FIG. 1 discloses a reformer reactor 10 which is a miniature chemical processing system that liberates hydrogen from hydrocarbon fuels including alcohols, with carbon dioxide, water, and carbon monoxide as by products. The hydrogen can be used for any use for which hydrogen is desired. However, reactor 10 is particularly useful for providing hydrogen to be electrochemically combined with oxygen in a fuel cell to produce portable electric power.

One design emphasis for reactor 10 is portability. Specifications achieved by the design are compactness, lightweight, operation on readily-available and easily-storable fuel (e.g., propane, alcohols, gasoline), near-atmospheric operating pressure, low overall pressure drop, and a firing rate of 250–500 Watts (LWV). The reactor 10 is sized for 100 Watts of delivered power when integrated as a fuel cell power system.

Figure 2:
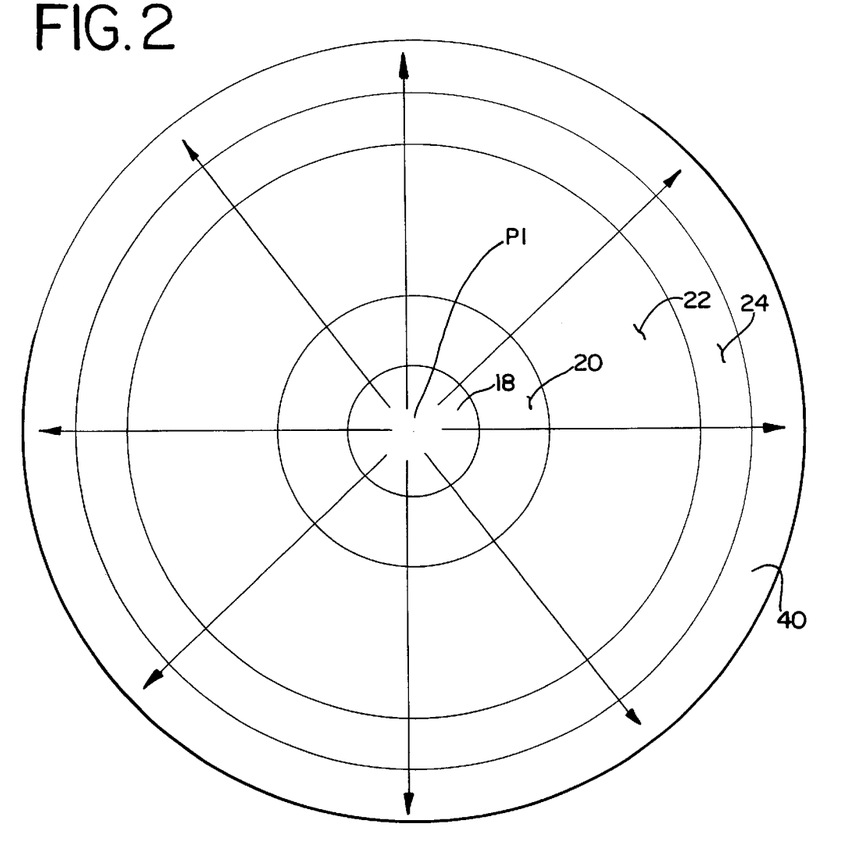
FIG. 2 is a schematic view of a horizontal cross section of reactor 10.

The reactor 10 has a metal cylindrical reactor housing 12 substantially capped at its axial ends by insulating slabs 14 and 16. In the housing 12, are sequentially adjacent, first, second, third, and fourth zones 18, 20, 22, and 24. As schematically shown in FIG. 2, the four zones 18, 20, 22, and 24 are nested cylinders. At the boundaries between the zones are permeable partitions in the form of wire mesh screens 28, 30, and 32. Referring back to FIG. 1, a partial oxidation reaction vessel 34 is located within the first zone 18. The vessel 34 has a frustoconical upper portion 58 having an opening 36. In other embodiments the portion 58 could be other shapes, such as, cylindrical or frustospherical.

In the basic mode of operation of the reactor 10, reactants, hydrocarbon fuel, steam and air are flowed as a reaction stream into the vessel 34 through inlet 38 where a partial oxidation is effected on the reaction stream to produce hydrogen and carbon monoxide predominantly. Some methane is produced as well and, depending on the reactant fuel, small amounts of waste constituents, such as gaseous sulphur compounds. The reaction stream exits opening 36 of vessel 34 and flows into, and fills, the first zone 18. The reaction stream is directed in diverging directions from the first zone 18 and into the second zone 20 along a flow path P1 (exemplary diverging radial directions indicated by arrows P1 FIGS. 1 and 2). The flow of the reaction stream continues in the same general diverging radial directions through the second, third and fourth zones 20, 22 and 24 all along flow path P1. Flow path P1 permits flow from an area 360° around each zone 18, 22 and 24 and over their entire axial lengths. The reaction stream then passes through a cylindrical wire mesh screen 42 to enter a cylindrical (annular) collection space 40 where hydrogen can be suitably collected and exited such as by exit tube 44. The width of the annular gas collection space 40 is chosen to sufficiently minimize pressure losses associated with flow consolidation and restriction.

In operation, when the reaction stream exits the partial oxidation vessel 34 it is initially flowing axially with respect to the first zone 18. This is the point at which the flow begins its transitions to radially diverging directions. However, the screen 28 has a mesh open area and sheet thickness selected to permit enough back-pressure so that the reaction stream fills the first zone 18. The back-pressure is still low enough so as not to impair flow efficiency or unduly increase parasitic energy loss. This is done to achieve near-uniform flow distribution out of the first zone 18 including from an annular area 46 surrounding the partial oxidation vessel 34. The screen 28 can also be constructed of material composition, thickness, and finish to assist in controlling the amount of heat transferring from the exothermal partial oxidation reaction vessel 34. For example, the finish could assist in reduction of radiant heat losses from the reaction vessel 34 and the first zone 18. Also, the flow partitioning provided by the open space along with the thermal conductivity of material can assist with even distribution of conductive and convective heat transfer into the second zone to reduce hot spots therein. In some embodiments the partitions themselves could be coated with catalyst to improve completeness of reaction.

Hydrocarbon fuel is fed to the reactor 10 through tube 48 which inside the reactor 10 is formed into three helical sections or passes as it approaches the inlet 38 of vessel 34. optionally, two-phase steam/water can be fed with the fuel into tube 48. An oxygen-containing gas, preferably air, is fed to the reactor 10 through tube 50 which inside the reactor 10 is formed into two helical passes as it approaches the inlet 38 of vessel 34. The multiple passes of the helical portions of tubes 48 and 50 are afforded by U-bends (not shown) joining the helical runs of tube 48. Preferably the inlet of the tubes 48 and 50 have an optimized maximal diameter and the outlets have an optimized minimal diameter.

The second zone 20 contains a catalyst suitable for catalyzing a steam reforming reaction in the reaction stream. Preferably, the steam reforming catalyst includes nickel with amounts of a noble metal, such as cobalt, platinum, palladium, rhodium, ruthenium, iridium, and a support such as magnesia, magnesium aluminate, alumina, silica, zirconia, singly or in combination. Alternatively, the steam reforming catalyst can be a single metal, such as nickel, or a noble metal supported on a refractory carrier like magnesia, magnesium aluminate, alumina, silica, or zirconia, singly or in combination, promoted by an alkali metal like potassium.

The third zone 22 contains a catalyst suitable for catalyzing a high-temperature shift reaction in the reaction stream. Examples of suitable high temperature shift catalysts are those that are operable at a temperature in the range of between about 300° C. and about 600° C. Preferably the high-temperature shift catalyst includes transition metal oxides, such as ferric oxide ($Fe_2O_3$) and chromic oxide ($Cr_2O_3$). Other types of high temperature shift catalysts include iron oxide and chromium oxide promoted with copper, iron silicide, supported platinum, supported palladium, and other supported platinum group metals, singly and in combination.

The fourth zone 24 contains a catalyst suitable for catalyzing a low-temperature shift in the reaction stream. An example of a suitable low temperature modifying catalyst are those that are operable at a temperature in a range of between about 150° C. and about 300° C. Preferably, the low temperature modifying catalyst includes cupric oxide (CuO) and zinc oxide (ZnO). Other types of low temperature shift catalysts include copper supported on other transition metal oxides like zirconia, zinc supported on transition metal oxides or refractory supports like silica or alumina, supported, supported ruthenium, supported rhenium, supported palladium, supported rhodium and supported gold.

Preferably, the high- and low-temperature shift catalysts are in granular form and the tubes 48 and 50 are buried in the catalyst granules. The diameters of the tubes 48 and 50 are individually selected to optimize heat exchange with the reaction stream and the catalysts while properly managing pressure drop.

Preferably the fuel/steam is delivered under pressure which permits a reduction in diameter (increased pressure drop) in the tube 48. The vapor pressure of gaseous fuels such as propane, fuel can be used to induce fuel flow. In the case of alcohols, a mini-pump or auxiliary heating to increase vapor pressure is required to establish driving pressure. It is preferable that the air not be delivered under pressure because of the parasitic power required to pressurize the air flow. Thus, the tube 50 can afford less pressure drop than tube 48 and therefore it has a relatively larger diameter.

Figure 3:
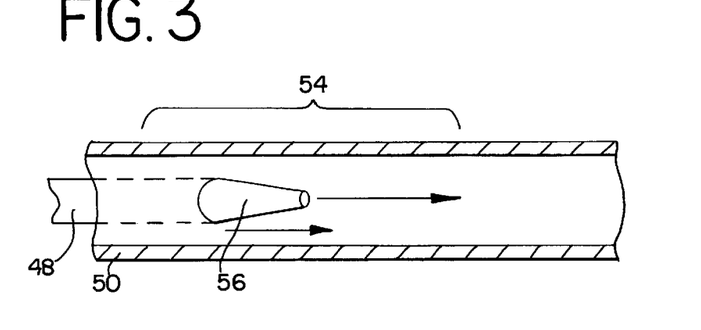
FIG. 3 is partial cross section view of a jet ejector 54 utilized in connection with reactor 10.

As disclosed in FIG. 3, the fuel steam and air feeds are preferably mixed inside the reactor housing 12 (not shown in FIG. 1) by a means for cooperating the means for flowing oxygen and the means for flowing fuel such that the flow of fuel assists the flow of oxygen. In the preferred embodiment a jet ejector 54 is provided such that the fuel-steam issues at a higher velocity from a smaller-diameter tube, such as a nozzle 56, disposed in the axial center of a portion of the air tube 50. As mentioned before, this reduces the amount of work being done to deliver the requisite amount of air because jet ejector 54 pulls the air, thereby minimizing requirements for upstream pressurization. The mixing location (i.e., the location of jet ejector 54) is chosen to minimize the chance of ignition of reactants before they reach the vessel 34, while ensuring satisfactory fuel/steam/air mixing.

After mixing, the reactants are directed to the inlet 38 of the vessel 34. The reactants are directed tangentially around the cylindrically-shaped vessel 34 so as to induce a swirling flow during combustion. This leads to better mixing, thermal homogeneity, and in general, better performance. For example, the swirling provides a higher flame stability and less tendency for carbon soot formation. The vessel 34 is sized to accommodate the requirements of 250–500 Watt thermal input (LHV). A frustoconical reducer 58 of the vessel 34, serves to maintain flame stability internally, as well as enhance the view factor for radiative heat exchange with the surroundings. Using gaseous fuels or alcohols, the reaction stream exiting the exit 36 of the vessel 34 will generally consist of 18–24 volume percent hydrogen gas, 8–12 volume percent carbon monoxide gas, and 2–3 volume percent methane gas, on a dry basis.

As the reaction stream flows through the second zone 20, the steam-reforming catalyst catalyzes a steam reforming of residual fuel. This increases hydrogen production efficiency. The level of methane after this stage will be generally on the order of 1 percent or less, with the hydrogen and carbon monoxide levels having increased accordingly.

As the reaction stream flows through the third zone 22, the high-temperature shift catalyst accelerates the water/gas-shift reaction in the temperature range of roughly 400° C.–650° C. These high temperatures lead to increased chemical kinetics, but lead to less favorable equilibrium, that is, higher carbon monoxide to hydrogen ratios. The water/gas-shift reaction is exothermic. As the shift reaction progresses, favorable equilibrium is increasingly more desirable than higher kinetic rate. In other words, at the inner radius of the third zone 22, high temperatures and corresponding high kinetic rates are desirable for a given flow throughput requirement. However, as the stream continues through the catalyst, a lower temperature with more favorable chemical equilibrium to produce hydrogen and corresponding lower kinetics is desirable.

Thus, it is important that the temperature of the third zone 22 have a temperature gradient decreasing in the direction of reaction stream flow across the third zone 22 in order to optimize performance. This is addressed in reactor 10 by utilization of the countercurrent heat exchange accomplished by tubes 48 and 50 carrying the reactant feed streams. The air/fuel/steam feed streams are cold with respect to reaction stream and catalyst in the third zone 22, thus balancing the reaction stream heat rejection requirement.

The composition of the reaction stream gases upon leaving the third zone 22 is 30–36 volume percent hydrogen and nominally 1 volume percent carbon monoxide.

As the reaction stream flows through the fourth zone 24, the low-temperature shift catalyst, catalyzes essentially the same reactions as in the third zone 22. Because this reaction is also exothermic, and should preferably be conducted at the lower temperatures of 250–450° C., heat exchange is necessary to cool the fourth zone. This cooling is effected by the first (radially outer-most) helical pass of the fuel/steam tube 48.

Figure 4:
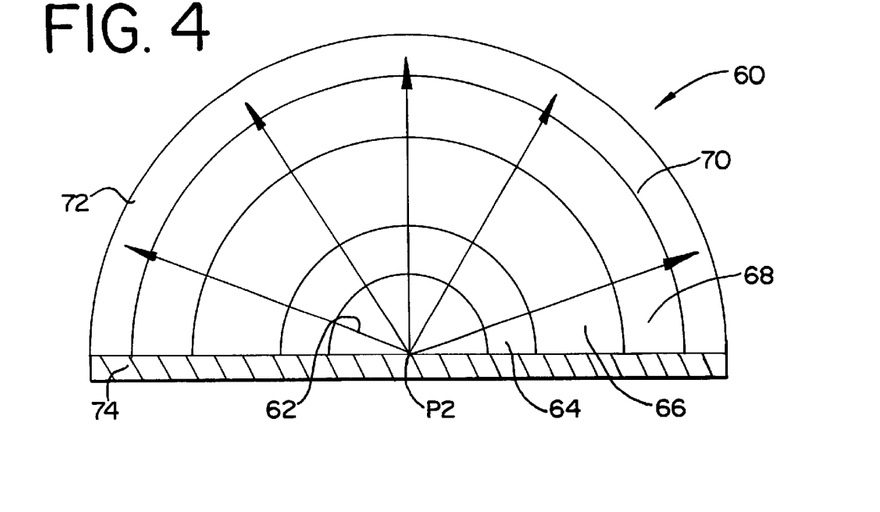
FIG. 4 is a schematic view of a vertical cross section of a hemispherical reactor 60.
Figure 5:
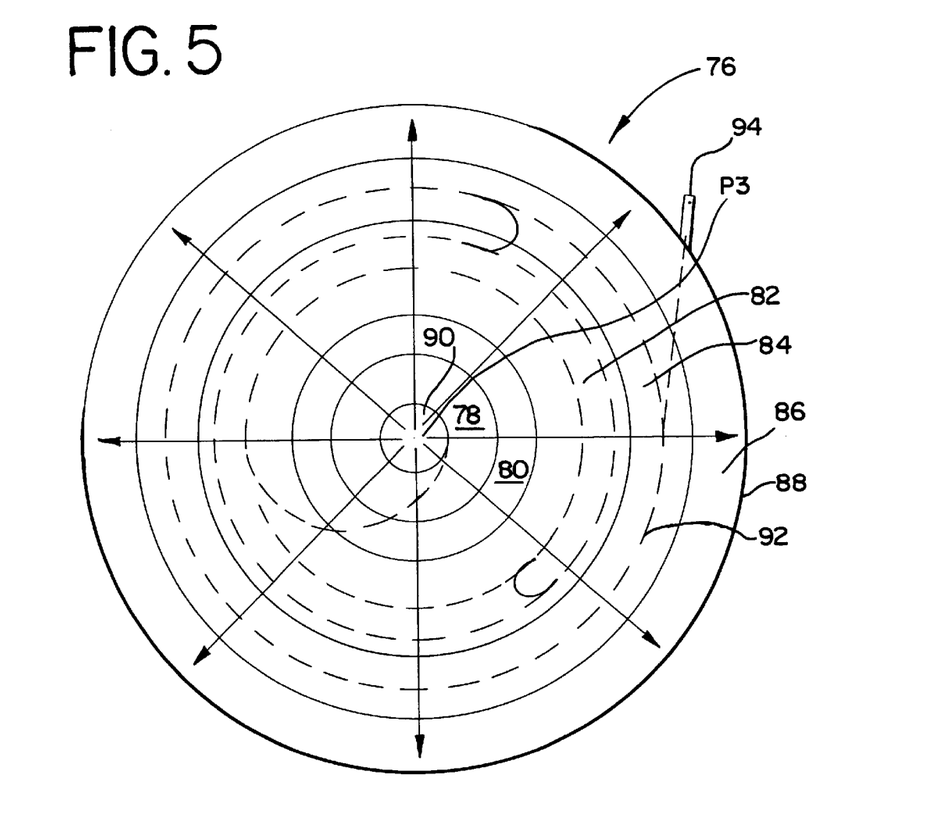
FIG. 5 is a schematic view of a vertical cross section of a spherical reactor 76; and, FIG. 6 is a schematic view of a vertical cross section of an alternate cylindrical reactor 96.
Figure 6:
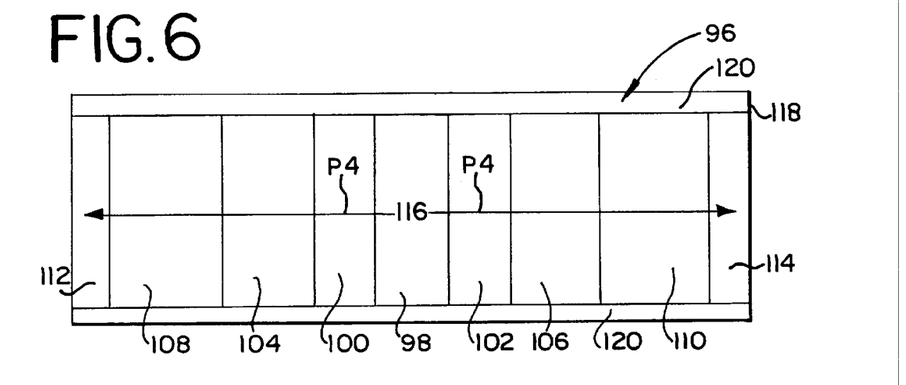

FIGS. 4–6 disclose other exemplary reactor geometries which will provide significant advantages according to the present invention.

FIG. 4 discloses a schematic cross section of a reformer reactor 60 with a hemispherical geometry. Nested, adjacent hemispherical zones 62, 64, 66, and 68 are provided in a geometry which permits a flow path P2 to direct reaction stream flow in diverging radial directions (along spherical coordinates) from the first zone 62, into and through the sequentially downstream zones 64, 66, and 68 and then into a collection space 70 defined by a hemispherical outer shell 72. A thermally insulating base 74 is provided to assist in the effort to have heat loss and reaction flow directed in the same directions.

FIG. 5 discloses a schematic cross section of a reformer reactor 76 with a spherical geometry. Nested, adjacent spherical zones 78, 80, 82, and 84 are provided in a geometry which permits a flow path P3 to direct reaction stream flow in diverging radial directions (along spherical coordinates) from the first zone 78, into and through the sequentially downstream zones 80–84 and then into a collection space 86 defined by a spherical outer shell 88. A spherical partial oxidation reaction vessel 90 (with openings, not shown) is provided at the center of the first zone 78. A fuel/steam tube 92 is disclosed schematically by hatched line. The tube has an inlet 94 and passes through the zones to effect the advantageous heat exchanges disclosed with respect to reactor 10. Similar preheat tubes could also be provided for air/oxygen.

FIG. 6 discloses a schematic cross section of a reformer reactor 96 with a cylindrical geometry such as reactor 10. However, reactor 96 has a first zone 98, which is adjacent to two second zones 100, 102, which are in turn adjacent to two third zones 104, 106, which are adjacent to two fourth zones 108, 110. Each zone is cylindrical; thus the geometry permits a flow path P4 to direct reaction stream flow in 180 degree diverging axial (rather than radial) directions from the first zone 98, into and through the sequentially downstream zones 100–110 and then into collection spaces 112, 114. As noted earlier, this diverging axial flow effectively doubles the throughput through the cylindrical cross section at a given pressure (or reduces the pressure required for a given throughput) as compared to conventional axial-flow reactor configurations. A partial oxidation reaction vessel 116 is provided at the center of the first zone 98 and could be fed reactants through counterflow, helically coiled, feed stream tubes such as tubes 48,50 of reactor 10. A cylindrical reactor housing 118 is provided with a thermally insulating cover 120 to assist in coinciding the direction of significant portions of thermal loss with the direction of reaction stream flow.

In all of the reformer reactors 10, 60, 76 and 96: partial oxidation of a hydrocarbon fuel may be conducted outside the reactor and a partially oxidized hydrocarbon reaction stream be fed into the first zones 18, 62, 78, and 98. Optionally, a partial oxidation reactor such as vessels 34, 90, and 116 can be located within the first zones. Also optionally, a reaction stream may be fed into the first zones 18, 62, 78 and 98, in a thermal condition for steam reforming therein. In all of the reformer reactors 60, 76 and 96, catalysts may be employed as desired in the various zones including the first zones 18, 62, 78 and 98.

One advantage of the geometries disclosed herein is that if a partial oxidation reaction is conducted in the first zone, the thermal energy of the exothermic reaction can be easily, and efficiently shared with a steam reforming reaction in an adjacent second zone. This is particularly advantageous where the second zone surrounds or substantially surrounds the first zone.

Tubes such as tubes 48,50 of reactor 10 could be used in the same way in each reactor 10, 60, 76 and 96, to achieve the same heat exchanges for preheating reactants and for providing an advantageous thermal gradient across catalyst zones. All of the boundaries between zones in each of the reactors 60, 76, and 96 are permeable to reaction stream flow. Permeable partitions disposed between zones, such as, mesh screens, expanded metal, reticulated ceramics, or the like, can be provided for this purpose.

All of the reformer reactors 10, 60, 76, and 96 have housings having first zones 18, 62, 78 and 98 for containing reactants in a reactions stream, collection spaces 40, 70, 86, and 112, for collecting product gas, and all have intermediate zones interposed between the first zones and the collection zones. Reaction stream flow paths P1–P4, along with appropriate thermal insulating members, 14, 16, 74, and 120, assist in directing heated reaction stream from the first zones to the collection spaces primarily in a direction coinciding with the direction of a substantial portion of the overall heat flux out of the reactors.

It should be understood that advantages of the present invention can be achieved for reactors utilizing a flow path directing flow in diverging directions and continuing in the same general directions from a first zone into and through a second zone even though the flow path between other zones in the same reactor may differ. Reference to a "first zone," "second zone," etc. is meant only to identify a particular zone's relative position to adjacent zones of interest.

Figure 7:
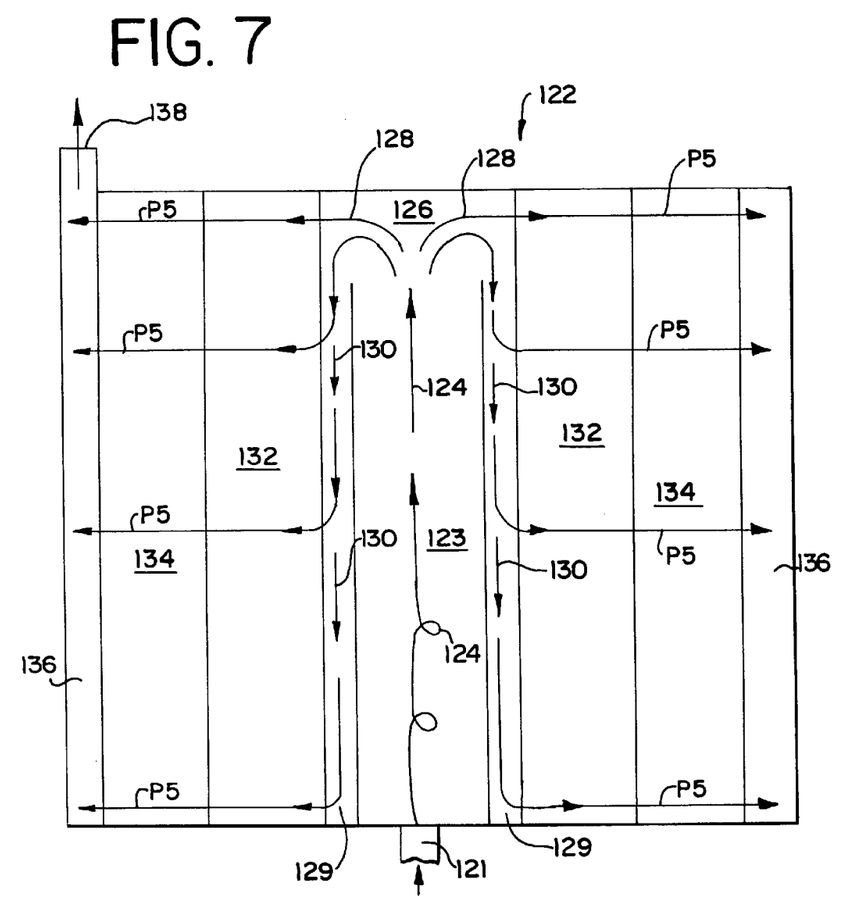
FIG. 7 is a schematic view of a vertical cross section of another embodiment of a cylindrical reactor 122.

For example, a first zone does not have to be the first zone or area of significance in the reactor. The designation of "first zone" merely means a zone which is immediately upstream and adjacent to a second zone of interest. To exemplify this, FIG. 7 is provided to schematically disclose a reactor 122 similar to reactor 10; but wherein reactants (reaction stream) initially flow axially (from inlet 121) through a central cylindrical steam-reforming zone 123 of the reactor 122 (as identified generally by arrows 124). Then the reactants turn and flow radially in diverging directions through a constricted transition zone 126 (as indicated by arrows 128). Then the reaction stream flows counter-axially into an annular first zone 129 (as indicated by the arrows 130. Then according to the invention, the reaction stream flows from first zone 129 into and through a second zone 132 and a third zone 134 along a flow path P5. An annular collection space 136 is provided to collect the desired reaction products, with an outlet 138 to direct the reaction products to a desired location.

It should also be understood that "same general direction" intends a focus on the dominant direction of the overall reaction stream flow entering, traversing, and exiting a zone. The phrase is not intended to include minor and temporary deviations of flow direction through a zone of small, discrete, portions of the reaction stream flowing around small obstructions such as, catalyst granules, heat exchange tubes, and the solid portions of partitions, such as expanded metal or screen mesh.

While the specific embodiments have been illustrated and described, numerous modifications come to mind without significantly departing from the spirit of the invention and the scope of protection is only limited by the scope of the accompanying claims.

What is claimed is:

1. A reformer reactor for producing hydrogen gas from hydrocarbons comprising:
   (a) a first zone having a partial oxidation reaction vessel, the vessel having an opening for emission of reactants into the first zone;
   (b) a second zone adjacent the first zone, the second zone containing a first catalyst suitable for promoting an endothermic reaction;
   (c) a first partition separating the first and second zones, the first partition having a plurality of spaced openings to permit the flow of the reaction stream therethrough; and
   (d) a flow path for directing flow of a reaction stream in diverging directions from the first zone into the second zone, the flow of the reaction stream continuing in the same general diverging directions through the second zone and the reactor being configured such that during operation, heat from the reaction stream after partial oxidation reaction is transferred to the first catalyst sufficient to support a temperature to promote steam reforming in the presence of the first catalyst, wherein the number, size, and spacing of the partition openings is selected to control the flow rate and uniformity of the reaction stream from the first zone and into the second zone.

2. The reactor of claim 1, further comprising a fourth zone adjacent a third zone, the flow path continuing a flow of the reaction stream into and through the third zone and fourth zone in the same general directions as the reaction stream flowed into and through the second zone.

3. The reactor of claim 1 wherein the first and second zones are generally spherical and the flow directions are radially away from the first zone.

4. The reactor of claim 1 wherein the first and second zones are generally hemispherical and the flow directions are radially away from a spherical portion of the hemispherical first zone.

5. The reactor of claim 1 wherein the first and second zones are generally cylindrical and the flow directions are radially away from the first zone.

6. The reactor of claim 1 wherein the first and second zones are generally cylindrical and the flow directions are axially away from the first zone.

7. The reactor of claim 2 wherein the first, second, third, and fourth zones are generally cylindrical and the flow directions are radially away from the first zone.

8. The reactor of claim 5 wherein the axial ends of each of the zones have a thermally-insulating member.

9. The reactor of claim 5 wherein axial ends of each of the zones have a thermally-insulating member.

10. The reactor of claim 1 wherein the first catalyst promotes a steam reforming reaction in the reaction stream.

11. The reactor of claim 5 wherein the first catalyst promotes a steam reforming reaction in the reaction stream.

12. The reactor of claim 5 wherein the second zone includes a suitable catalyst for catalyzing a steam reforming reaction in the reaction stream.

13. The reactor of claim 7 wherein the first catalyst promotes a steam reforming reaction in the reaction stream, the third zone contains a suitable catalyst for catalyzing a high-temperature shift reaction in the reaction stream, and the fourth zone contains a suitable catalyst for catalyzing a low-temperature shift reaction in the reaction stream.

14. The reactor of claim 1 wherein the first partition is a screen mesh.

15. The reactor of claim 1 wherein the first partition is a screen mesh.

16. The reactor of claim 1 further comprising a partial oxidation reaction vessel located within the first zone, the vessel having an opening for emission of partially-oxidized hydrocarbons into the first zone.

17. The reactor of claim 2, further comprising a means for heat exchange with hydrocarbon reactant prior to entry of the hydrocarbon reactants into the first zone, the means being disposed in at least one of the second or third zones so as to utilize heat from the reaction stream flowing therethrough to preheat the feed stream.

18. The reactor of claim 2, further comprising a reactant feed stream for providing reactants into the reaction stream, and means for heat exchange with the reactant feed stream prior to entry of the reactants into the first zone, the means being disposed in at least one of the second, third, and fourth zones so as to utilize heat from the reactant stream flowing therethrough to preheat the feed stream.

19. The reactor of claim 2, further comprising a reactant feed stream for providing reactants into the reaction stream and means for heat exchange with the reactant feed stream prior to entry of the reactants into the first zone, the means being disposed in the catalyst for direct contact therewith in at least one of the second, third, and fourth zones so as to utilize heat from the reactant stream flowing therethrough and the heat of the catalyst to preheat the feed stream.

20. The reactor of claim 17 wherein the means for heat exchange with hydrocarbon reactant includes means for regulating the heat exchange so that a desired thermal gradient can be maintained in the catalyst of the third zone and the reaction stream temperature across the zone wherein the means for heat exchange is disposed.

21. The reactor of claim 11 further comprising a means for heat exchange with a reactant feed stream having means for regulating the heat exchange so that a thermal gradient can be maintained in the catalyst of the third zone and the reaction stream temperature across the zone wherein the means for heat exchange is disposed.

22. The reactor of claim 1 further comprising:
(a) means for flowing oxygen to the first zone;
(b) means for flowing a fuel to be oxidized to the first zone; and,
(c) means for cooperating the means for flowing oxygen and the means for flowing a fuel such that the flow of fuel assists the flow of oxygen.

23. The reactor of claim 5 further comprising:
(a) means for flowing oxygen to the first zone;
(b) means for flowing a fuel to be oxidized to the first zone; and,
(c) means for cooperating the means for flowing oxygen and the means for flowing a fuel such that the flow of fuel assists the flow of oxygen.

24. The reactor of claim 22 wherein the means for cooperating includes a fuel conduit for fuel flow and an oxygen conduit for oxygen flow, the fuel conduit being joined to the oxygen conduit such that flowing the fuel at a higher velocity than a velocity of the oxygen will assist in speeding the flow of oxygen in the oxygen conduit.

25. The reactor of claim 22 further comprising a pressurized container for holding a gaseous hydrocarbon fuel.

26. The reactor of claim 22 wherein the means for flowing oxygen includes a first tube, the means for flowing a fuel includes a second tube, and the means for cooperating includes a union of the first and second tubes such that a spray of fuel can issue from the second tube inside the first oxygen-carrying tube.

27. A reformer reactor for producing hydrogen gas from hydrocarbons comprising:
(a) a first zone having a partial oxidation reaction vessel, the vessel having an opening for emission of reactants into the first zone;
(b) a second zone adjacent the first zone, the second zone containing a first catalyst suitable for promoting an endothermic reaction;
(c) a first partition separating the first and second zones, the first partition having a plurality of spaced openings to permit the flow of the reaction stream therethrough; and
(d) a flow path for directing flow of a reaction stream in diverging directions from the first zone into the second zone, the flow of the reaction stream continuing in the same general diverging directions through the second zone and the reactor being configured such that during operation, heat from the reaction stream after partial oxidation reaction is transferred to the first catalyst sufficient to support a temperature to promote steam reforming in the presence of the first catalyst, wherein the first partition being constructed of material composition, thickness, and finish to assist in controlling heat transfer between the reaction vessel and the second zone.

28. The reactor of claim 27 wherein the partition is a screen mesh.

29. The reactor of claim 27, further comprising a fourth zone adjacent a third zone, the flow path continuing a flow of the reaction stream into and through the third zone and fourth zone in the same general directions as the reaction stream flowed into and through the second zone.

30. The reactor of claim 27 wherein the first and second zones are generally spherical and the flow directions are radially away from the first zone.

31. The reactor of claim 27 wherein the first and second zones are generally hemispherical and the flow directions are radially away from a spherical portion of the hemispherical first zone.

32. The reactor of claim 27 wherein the first and second zones are generally cylindrical and the flow directions are radially away from the first zone.

33. The reactor of claim 27 wherein the first and second zones are generally cylindrical and the flow directions are axially away from the first zone.

34. The reactor of claim 29 wherein the first, second, third, and fourth zones are generally cylindrical and the flow directions are radially away from the first zone.

35. The reactor of claim 32 wherein the axial ends of each of the zones have a thermally-insulating member.

36. The reactor of claim 32 wherein axial ends of each of the zones have a thermally-insulating member.

37. The reactor of claim 27 wherein the first catalyst promotes a steam reforming reaction in the reaction stream.

38. The reactor of claim 29 wherein the first catalyst will promote a steam reforming reaction in the reaction stream, and including a second catalyst in the third zone, the second catalyst having a composition that will promote a high-temperature shift reaction in the reaction stream, and the fourth zone including a third catalyst having a composition that will promote a low-temperature shift reaction in the reaction stream.

39. The reactor of claim 32 wherein the first catalyst promotes a steam reforming reaction in the reaction stream.

40. The reactor of claim 34 wherein the first catalyst promotes a steam reforming reaction in the reaction stream, the third zone contains a suitable catalyst for catalyzing a high-temperature shift reaction in the reaction stream, and the fourth zone contains a suitable catalyst for catalyzing a low-temperature shift reaction in the reaction stream.

41. The reactor of claim 27 wherein the first partition is a screen mesh.

42. The reactor of claim 27 further comprising a partial oxidation reaction vessel located within the first zone, the vessel having an opening for emission of partially-oxidized hydrocarbons into the first zone.

43. The reactor of claim 29, further comprising a means for heat exchange with hydrocarbon reactant prior to entry of the hydrocarbon reactants into the first zone, the means being disposed in at least one of the second or third zones so as to utilize heat from the reaction stream flowing therethrough to preheat the feed stream.

44. The reactor of claim 29, further comprising a reactant feed stream for providing reactants into the reaction stream, and means for heat exchange with the reactant feed stream prior to entry of the reactants into the first zone, the means being disposed in at least one of the second, third, and fourth zones so as to utilize heat from the reactant stream flowing therethrough to preheat the feed stream.

45. The reactor of claim 29, further comprising a reactant feed stream for providing reactants into the reaction stream and means for heat exchange with the reactant feed stream prior to entry of the reactants into the first zone, the means being disposed in the catalyst for direct contact therewith in at least one of the second, third, and fourth zones so as to utilize heat from the reactant stream flowing therethrough and the heat of the catalyst to preheat the feed stream.

46. The reactor of claim 43 wherein the means for heat exchange with hydrocarbon reactant includes means for regulating the heat exchange so that a thermal gradient can be maintained in the catalyst of the third zone and the reaction stream temperature across the zone wherein the means for heat exchange is disposed.

47. The reactor of claim 39 further comprising a means for heat exchange with a reactant feed stream having means for regulating the heat exchange so that a desired thermal gradient can be maintained in the catalyst of the third zone and the reaction stream temperature across the zone wherein the means for heat exchange is disposed.

48. The reactor of claim 27 further comprising:
(a) means for flowing oxygen to the first zone;
(b) means for flowing a fuel to be oxidized to the first zone; and,
(c) means for cooperating the means for flowing oxygen and the means for flowing a fuel such that the flow of fuel assists the flow of oxygen.

49. The reactor of claim 32 further comprising:
(a) means for flowing oxygen to the first zone;
(b) means for flowing a fuel to be oxidized to the first zone; and,
(c) means for cooperating the means for flowing oxygen and the means for flowing a fuel such that the flow of fuel assists the flow of oxygen.

50. The reactor of claim 48 wherein the means for cooperating includes a fuel conduit for fuel flow and an oxygen conduit for oxygen flow, the fuel conduit being joined to the oxygen conduit such that flowing the fuel at a higher velocity than a velocity of the oxygen will assist in speeding the flow of oxygen in the oxygen conduit.

51. The reactor of claim 48 further comprising a pressurized container for holding a gaseous hydrocarbon fuel.

52. The reactor of claim 48 wherein the means for flowing oxygen includes a first tube, the means for flowing a fuel includes a second tube, and the means for cooperating includes a union of the first and second tubes such that a spray of fuel can issue from the second tube inside the first oxygen-carrying tube.

53. A reactor for reforming hydrocarbons to produce hydrogen having one or more inlets to permit entry of hydrocarbons, an oxygen-containing gas, and water in the form of steam, comprising:

a first zone for receiving the hydrocarbons, oxygen-containing gas, and water, in the form of steam, the first zone including a vessel for conducting partial oxidation of the hydrocarbons to form a partially oxidized reformate;

a second zone containing a catalyst having the characteristic of promoting the reforming the partially oxidized hydrocarbon reformate, in the presence of steam, into carbon monoxide and hydrogen;

a third zone containing a catalyst having the characteristic of promoting a water-gas-shift reaction with respect to the carbon monoxide and hydrogen in the reformate at temperature in a first shift-temperature range;

a fourth zone containing a catalyst having the characteristic of promoting a water-gas-shift reaction with respect to the carbon monoxide and hydrogen in the reformate at a second temperature within a second shift-temperature range, which range is lower than the first shift-temperature range;

first heat exchange tubes in at least one of the the third and fourth zoness for preheating at least one of the hydrocarbons, the oxygen-containing gas, or water, a reaction flow path that is radially away from the first zone into the second, third and fourth zones, respectively; and, partitions separating the first, second, third, and fourth zones, each partition having a plurality of openings to permit reformate to pass from the first zone and through the subsequent zones.

54. The reactor of claim 53 wherein the partitions are a screen mesh.

55. The reactor of claim 53 wherein all of the zones are arranged as nested coaxial cylinders and the vessel includes sufficient thermal insulation at its axial ends such that heat flux and the reactant flow is primarily radially outward from the first zone to a collection zone.

* * * * *